Jan. 11, 1966 R. L. ROST 3,228,699

TONE ARM

Filed March 8, 1962 2 Sheets-Sheet 1

INVENTOR.
Richard L. Rost

BY
Francis W. Crotty
Atty.

TONE ARM

Filed March 8, 1962 2 Sheets-Sheet 2

INVENTOR.
Richard L. Rost
BY Francis W. Crotty
Atty.

United States Patent Office 3,228,699

Patented Jan. 11, 1966

3,228,699
TONE ARM

Richard L. Rost, Barrington, Ill., assignor to Zenith Radio Corporation, Chicago, Ill., a corporation of Delaware Filed Mar. 8, 1962, Ser. No. 178,480
7 Claims. (Cl. 274—23)

The invention is directed to an improved tone arm and more specifically to a tone arm mounting.

The manufacture of record disks of the microgroove type having wide frequency range reproduction capabilities has necessitated the design of improved record reproducing equipment. The tone arm is, of course, one of the more important components of such equipment. In the case of a tone arm having a low stylus tracking pressure of, for example 2 grams it is important to reduce bearing friction to a minimum. At the same time it is necessary that the tone arm bearings be of economical construction and be able to withstand the shocks of rought handling which occur in every day consumer usage.

It is therefore a principal object of this invention to provide an improved tone arm.

It is another object of this invention to provide a tone arm mounting within a minimum bearing friction.

It is still another object of this invention to provide a tone arm mounting which is economical in construction.

It is yet another object of this invention to provide a tone arm mounting which is resistant to shock impact.

In accordance with the above objects, a tone arm assembly for a record changing phonograph of the type adapted to play records disposed in a horizontal plane is provided with a tone arm element and a support member for the element. The asembly comprises a knife edge member carried by the tone arm element, having a notched edge portion defining a V-shaped recess in the knife edge member. A pair of opposed vertical leg members are secured to the support member and individually have a notch edge portion defining a V-shaped recess for receiving the pivot plate. The notched edge portion of the plate is nested within the notched edge portion of one of the leg members to pivotally support the tone arm for movement in a vertical plane.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
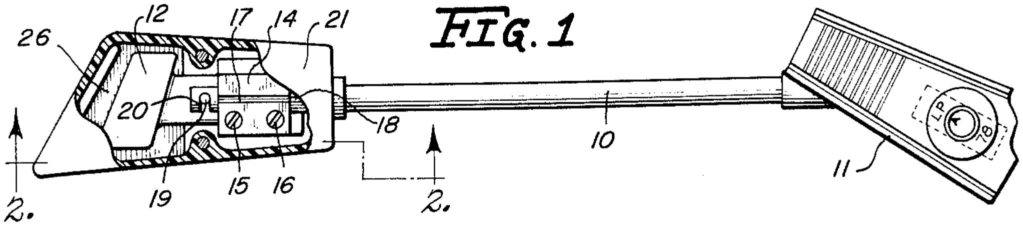
FIGURE 1 is a plan view partially cut away of a tone arm assembly embodying the invention.
Figures 2, 3, 4:
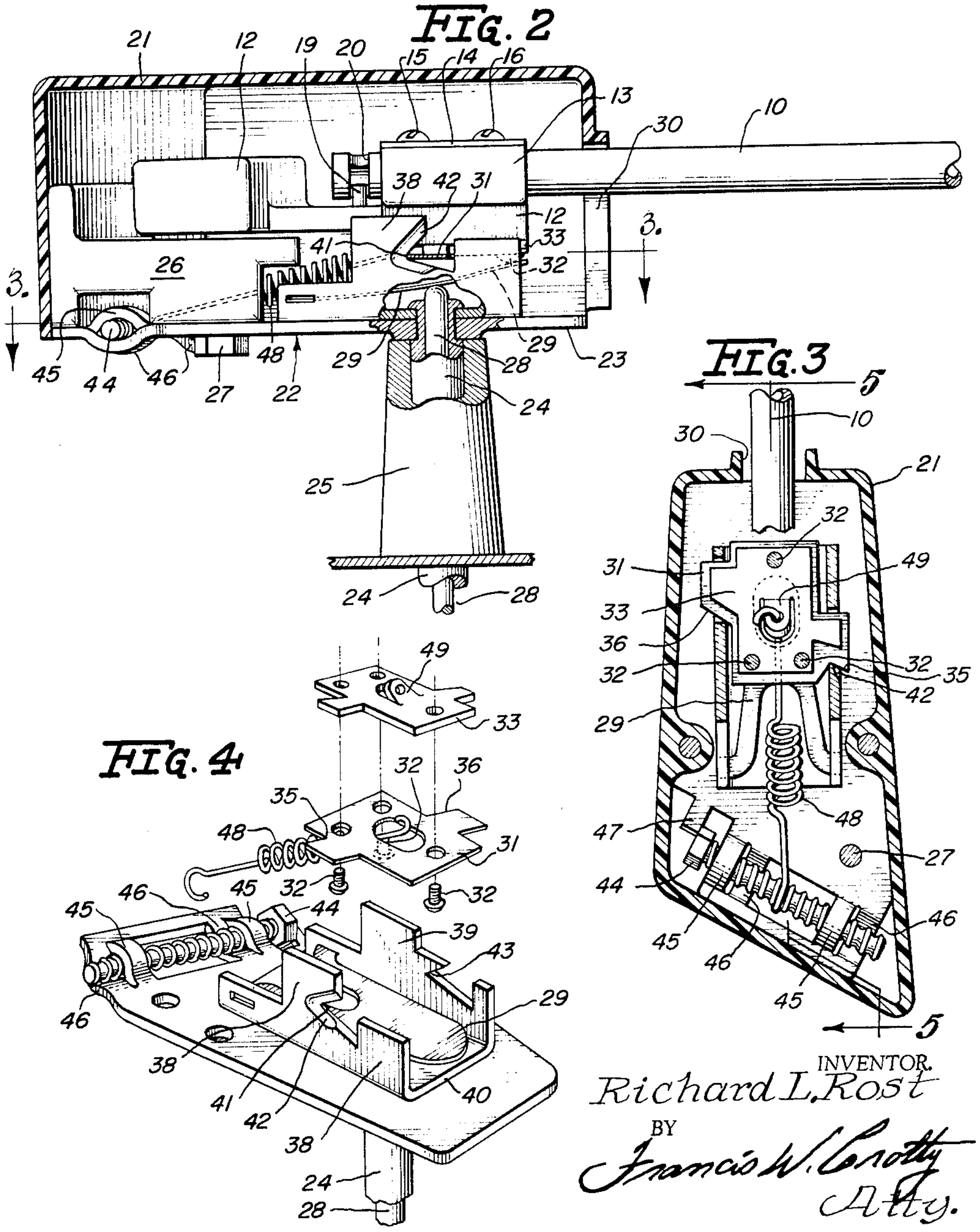
FIGURE 2 is an enlarged partial sectional view taken along line 2—2 of FIGURE 1 with parts broken away.
FIGURE 3 is a sectional view taken along line 3—3 of FIGURE 2.
FIGURE 4 is an exploded view of a portion of FIGURE 3.
Figure 5:
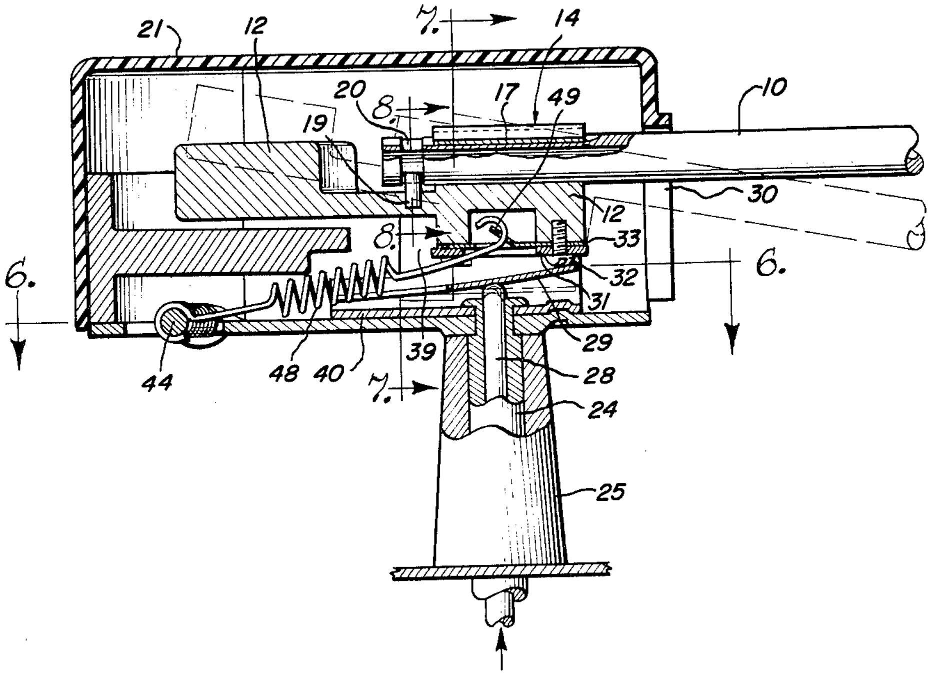
FIGURE 5 is a longitudinal sectional view taken along line 5—5 of FIGURE 3.
Figure 7:
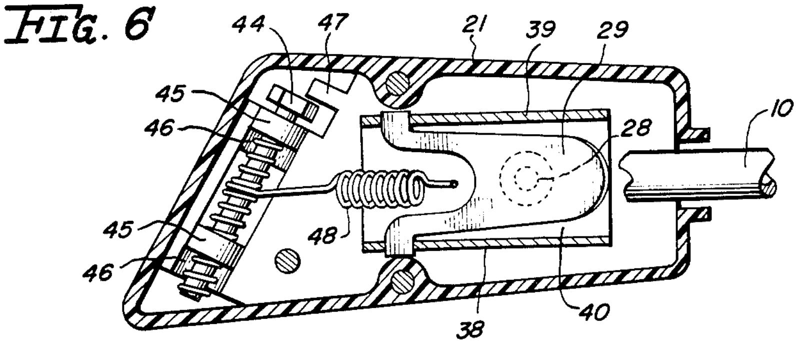
FIGURE 7 is a transverse sectional view taken along line 7—7 of FIGURE 5.
Figure 8:
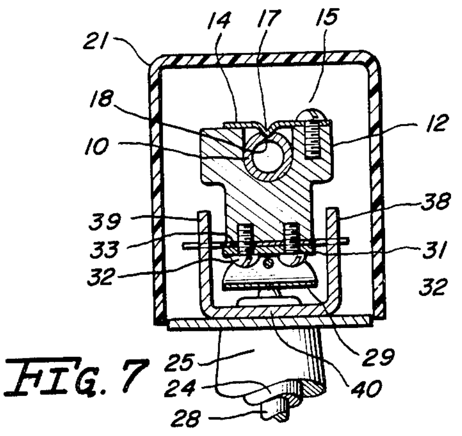
FIGURE 8 is a fragmentary view of a portion of the booming mounting structure taken along line 8—8 of FIGURE 5.

FIGURES 1, 2 and 5 illustrate the essential components of a tone arm element which include a tubular boom 10 carrying a record stylus housing 11 at its free extremity and mounted in a boom bearing block 12 at its other end. The tubular boom is held in a U-shaped cavity in boom bearing block 12, the legs of the U-shaped member being shown most clearly in FIGURE 7, and is retained there by a flexible detent plate 14 fastened to boom bearing block 12 by screws 15 and 16. The detent plate has a creased channel 17 which engages a mating channel 18 in boom 10 to prevent rotational movement of the boom. Longitudinal movement of the boom is prevented by a stud 19 which protrudes from boom block 12 into a semi-circular notch 20 near the end of boom 10, a detailed view of which is shown in FIGURE 8.

Boom black 12 is pivotally supported on a support 22 which includes a bottom plate 23 fixed on a shaft 24 for horizontal rotation. The weight of boom 10 and stylus cartridge housing 11 is balanced by a lead counter-weight 26 which is fastened to bottom plate 23 by a threaded bolt 27. Shaft 24 is journalled in a base 25 of a record changer (not shown) and includes a lift pin 28 in a hollow center portion of the shaft which is employed to raise the tone arm element during a record-change cycle in a manner well known in the art. As shown in FIGURES 2 and 5, the lift pin engages a lift plate 29 when moved upwardly which in turn acts as a lever against the bottom portion of boom bearing block 12 to raise boom 10 and record stylus housing 11. When the tone arm is in operation tracking a record disk, pin 28 is retracted so that the stylus in head 11 nests upon the record being played. The tone arm embodying the present invention may also be advantageously used on non-changer type manual turntables. In this case lift pin 28 is eliminated.

Both support 22 and the boom bearing block portion of the tone arm element are housed in a plastic shell 21 having a U-shaped opening through which boom 10 extends.

Means are provided for pivoting the tone arm elements 10, 11, 12 on support 22 for movement in a vertical plane. As best shown in FIGURES 3, 4 and 5, a pivot plate 31 is fastened to the bottom of boom block 12 by means of screws 32 through an intermediate backing plate 33. A V-shaped recess 35 is provided in one marginal portion of the pivot plate and a laterally extending straight edge portion 36 is oppositely disposed on another portion of plate 31. Pivot plate 31 is constructed of a relatively thin sheet material to effectively constitute V-shaped recess 35 and straight edge 36 as knife edges. Backing plate 33 is of a similar configuration as plate 31 to provide the necessary rigidity to the thin material of plate 31.

Means for receiving the pivot plate knife edges includes a pair of opposed vertical leg members 38 and 39 of a channel member which is secured to bottom plate 23. More specifically, upright portions 38, 39 constitute the two legs of a U-shaped channel member 40 with the bight portion of the U-shaped member fastened to bottom plate 23. Leg 38 includes a V-shaped recess 41 having a scalloped out portion 42 to provide a relatively thin bearing surface and leg 39 has a V-shaped recess 43. Upright members 38 and 39 and their respective recesses are spaced to receive recess 35 of pivot plate 31 in recess 41 of leg 38 and straight edge 36 in recess 43 of leg 39. As best shown in FIGURE 3 scalloped area 42 permits a small area contact between recesses 35 and 41 thereby reducing friction to a minimum and increasing the accuracy of the positioning of tone arm element 10, 11, 12 on support 22.

Figure 6:
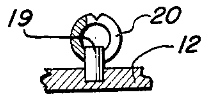
FIGURE 6 is a sectional plan view taken along line 6—6 of FIGURE 5.

Bottom plate 23 also includes an adjustment screw 44 which is retained on the bottom plate by two pairs of opposed straps 45 and 46 bent out from the plate and which is restrained from longitudinal movement by a tab 47 extending from bottom plate 23 as best shown in FIGURES 3 and 6.

Pivot plate 31 is retained in engagement with leg members 38 and 39 by a coiled spring 48 having one end connected to a tab 49 on backing plate 33 and the other end looped over adjusting screw 44. In addition to retaining the tone arm element in engagement with its support member, spring 48 partially counterbalances the weight of boom 10 and cartridge housing 11 to give the desired stylus tracking pressure. The remainder of the counterbalancing force is derived from the portion of lead boom bearing block 12 which is behind the pivotal axis. Spring tension may be adjusted by rotation of adjustment screw 44 as best shown in FIGURES 3 and 5 to either lengthen spring 48 by moving the end of the spring to the right thereby increasing its counterbalancing force or to shorten the spring by moving its end to the left thereby lessening the counterbalancing force.

Thus, an improved tone arm mounting has been provided which has a minimum amount of bearing friction in view of the knife edge bearings. Moreover, the tone arm is economical in construction since the number of component parts have been reduced to a minimum and tolerance requirements have been liberalized. This has been brought about by the nesting of V-shaped recess 41 with V-shaped recess 35 which serves to accurately position the tone arm element whereas V-shaped recess 43 acts merely as a bearing in which straight portion 36 is slidable.

A further advantage of the tone arm mounting is its ruggedness; the knife edge construction has a distinct advantage over delicate needle bearing construction.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A tone arm assembly adapted for use with a record changing phonograph of the type designed to play records disposed in a horizontal plane, said tone arm assembly comprising:
- a tone arm element;
- a knife edge member, carried by said tone arm element, having a laterally extending straight edge portion and further having a notched edge portion oppositely disposed from said straight edge portion and defining a horizontally disposed V-shaped recess in said knife edge member;
- a support member;
- a mounting bracket secured to said support member and including a pair of opposed vertical leg members, each of said leg members having a notched edge portion defining a vertically disposed V-shaped recess therein;
- and means for retaining said straight edge portion and said notched edge portion of said knife edge member in engagement with respective ones of said notched portions of said mounting bracket to pivotally support said tone arm for movement in a vertical plane.

2. A tone arm assembly adapted for use with a record changing phonograph of the type designed to play records disposed in a horizontal plane, said tone arm assembly comprising:
- a tone arm element;
- a pivot plate, carried by said tone arm element, having a notched edge portion defining a V-shaped recess in said pivot plate;
- a support member;
- a pair of opposed vertical leg members secured to said support member and individually having a notched edge portion defining a vertically disposed V-shaped recess for receiving said pivot plate with the notched edge portion of said pivot plate nested within the notched edge portion of one of said leg members to support said tone arm element for pivotal movement in a vertical plane;
- a lift plate supported between said leg members and adapted to engage said tone arm element forwardly of said leg members;
- and means for actuating said lift plate to engage said tone arm element and effect pivotal movement thereof in said vertical plane.

3. A tone arm assembly adapted for use with a record changing phonograph of the type designed to play records disposed in a horizontal plane, said tone arm assembly comprising:
- a support member mounted for pivotal movement in a horizontal plane;
- a tone arm having a boom portion, a cartridge housing at one end of said boom portion and a mounting portion at the opposite end of said boom portion, disposed across the pivotal axis of said support member;
- a pivot plate, secured to the lower surface of said tone arm mounting portion having a notched edge portion defining a horizontally disposed V-shaped recess in said pivot plate;
- a pair of opposed vertical leg members secured to said support member on opposite sides of said tone arm mounting portion and individually having a notched edge portion defining a vertically disposed V-shaped recess for receiving said pivot plate with the notched edge portion of said plate nested within the notched edge portion of one of said leg members to support said tone arm for pivotal movement in a vertical plane;
- a lift plate supported between said leg members and adapted to engage said tone arm mounting portion forwardly of said leg members;
- and means for actuating said lift plate to engage said mounting portion and effect pivotal movement thereof in a vertical plane.

4. A tone arm assembly adapted for use with a record changing phonograph of the type designed to play records disposed in a horizontal plane, said tone arm assembly comprising:
- a support member mounted for pivotal movement in a horizontal plane;
- a tone arm having a boom portion, a cartridge housing at one end of said boom portion and a mounting portion at the opposite end of said boom portion;
- a pivot plate, secured to the lower surface of said tone arm mounting portion, having a notched edge portion defining a horizontally disposed V-shaped recess in said pivot plate;
- a pair of opposed vertical leg members secured to said support members on opposite sides of said tone arm, mounting portion and indivdually having a notched edge portion defining a vertically disposed V-shaped recess for receiving said pivot plate with said notched portion of said plate nested within the notched portion of one of said leg members to support said tone arm for pivotal movement in a vertical plane;
- a lift plate supported between said leg members and adapted to engage said tone arm mounting portion forwardly of said leg members;
- means for actuating said lift plate to engage said tone arm mounting portion and effect pivotal movement thereof in said vertical plane;
- a substantially horizontally disposed member rotatably mounted on said support member rearwardly of said vertical leg members in a direction transverse to said tone arm boom portion;
- and a spring, fastened at one end to said tone arm mounting portion and at the opposite end to said horizontal member to exert a force which is adjustable upon rotation of said member, for retaining said pivot plate in engagement with said vertical leg members.

5. A tone arm assembly adapted for use with a record changing phonograph of the type designed to play records disposed in a horizontal plane, said tone arm assembly comprising:
  a support member mounted for pivotal movement in a horizontal plane;
  a tone arm having a boom portion, a cartridge housing at one end of said boom portion and a mounting portion at the opposite end of said boom portion;
  a pivot plate secured to the lower surface of said tone arm mounting portion having a notched edge portion defining a horizontally disposed V-shaped recess in said pivot plate;
  a pair of opposed vertical leg members secured to said support member on opposite sides of said tone arm mounting portion and individually having a notched edge portion defining a vertically disposed V-shaped recess for receiving said pivot plate with the notched portion of said pivot plate nested within the notched portion of one of said leg members to support said tone arm for pivotal movement relative to said support member in a vertical plane;
  a lift plate supported between said leg members and adapted to engage said tone arm mounting portion forwardly of said leg members;
  means for actuating said lift plate to engage said tone arm element and effect pivotal movement thereof in said vertical plane;
  a cover enclosing said support member and said tone arm mounting portion;
  a substantially horizontally disposed member rotatably mounted on said support member rearwardly of said vertical leg members in a direction transverse to said tone arm boom portion and accessible for rotational adjustment with said cover in situ;
  and a spring, fastened at one end to said tone arm mounting portion and at the opposite end to said horizontal member to exert a force which is adjustable upon rotation of said member, for retaining said pivot plate in engagement with said leg members.

6. A tone arm assembly adapted for use with a record changing phonograph of the type designed to play records disposed in a horizontal plane, said tone arm assembly comprising:
  a support member mounted for pivotal movement in a horizontal plane;
  a tone arm having a boom portion, a cartridge housing at one end of said boom portion and a mounting portion at the opposite end of said boom portion;
  a pivot plate secured to the lower surface of said tone arm mounting portion having a notched edge portion defining a horizontally disposed V-shaped recess in said pivot plate;
  a pair of opposed vertical leg members secured to said support member on opposite sides of said tone arm mounting portion and individually having a notched edge portion defining a vertically disposed V-shaped recess for receiving said pivot plate with the notched portion of said plate nested within the notched portion of one of said leg members to support said tone arm for pivotal movement in a vertical plane;

a lift plate supported between said leg members and adapted to engage said tone arm mounting portion forwardly of said leg members;
  means for actuating said lift plate to engage said tone arm element and effect pivotal movement thereof in said vertical plane;
  a member rotatably mounted on said support rearwardly of said leg members in a direction transverse to said tone arm boom portion;
  a spring, fastened at one end to said tone arm mounting portion and at the opposite end to said horizontal member to exert a force which is adjustable upon rotation of said horizontal member, for retaining said pivot plate in engagement with said leg members;
  and a pair of counterweights secured to said support member and to said tone arm mounting portion, respectively, in locations rearward of said leg members, the mass of said counterweights and the tension of said spring being proportioned to dynamically balance said assembly.

7. A tone arm assembly adapted for use with a record changing phonograph of the type designed to play records disposed in a horizontal plane, said tone arm assembly comprising:
  a support member mounted for pivotal movement in a horizontal plane;
  a tone arm having a tubular boom portion, a cartridge housing at one end of said boom portion and a mounting portion at the opposite end of said boom portion disposed across the pivotal axis of said support member;
  a key and channelway in said boom and mounting portions of said tone arm, respectively, for normally restraining relative rotary motion therebetween;
  a pivot plate secured to the lower surface of said tone arm mounting portion having a notched edge portion defining a horizontally disposed V-shaped recess in said pivot plate;
  a pair of opposed leg members secured to said support member on opposite sides of said tone arm mounting portion and individually having a notched edge portion defining a vertically disposed V-shaped recess for receiving said pivot plate with the notched edge portion of said plate nested within the notched edge portion of one of said leg members to support said tone arm for pivotal movement in a vertical plane;
  and a lift plate supported between said leg members and adapted to engage said tone arm element forwardly of said leg members;
  and means for actuating said lift plate to engage said tone arm element and effect pivotal movement thereof in said vertical plane.

References Cited by the Examiner

UNITED STATES PATENTS

| | | | |
|---|---|---|---|
| 2,174,156 | 9/1939 | Guedon | 274—23 |
| 2,434,033 | 1/1948 | Coin | 274—23 |
| 2,545,363 | 3/1951 | Kenney | 274—23 |

FOREIGN PATENTS

| | | |
|---|---|---|
| 618,814 | 2/1949 | Great Britain. |

LOUIS J. CAPOZI, *Primary Examiner.*

A. F. GUIDA, *Examiner.*